US008335853B2

(12) United States Patent
Bharrat

(10) Patent No.: US 8,335,853 B2
(45) Date of Patent: Dec. 18, 2012

(54) TRANSPARENT RECOVERY OF TRANSPORT CONNECTIONS USING PACKET TRANSLATION TECHNIQUES

(75) Inventor: Shaun Jaikarran Bharrat, Manalapan, NJ (US)

(73) Assignee: Sonus Networks, Inc., Westford, MA (US)

( * ) Notice: Subject to any disclaimer, the term of this patent is extended or adjusted under 35 U.S.C. 154(b) by 530 days.

(21) Appl. No.: 12/641,105

(22) Filed: Dec. 17, 2009

(65) Prior Publication Data
US 2011/0153834 A1 Jun. 23, 2011

(51) Int. Cl.
G06F 15/16 (2006.01)
(52) U.S. Cl. .................................. 709/227; 709/230
(58) Field of Classification Search .................. 709/217, 709/227
See application file for complete search history.

(56) References Cited

U.S. PATENT DOCUMENTS

| 5,978,849 | A | | 11/1999 | Khanna | 709/227 |
|---|---|---|---|---|---|
| 5,999,541 | A | * | 12/1999 | Hinchey et al. | 370/466 |
| 6,021,507 | A | | 2/2000 | Chen | 714/2 |
| 6,857,009 | B1 | * | 2/2005 | Ferreria et al. | 709/219 |
| 6,880,013 | B2 | | 4/2005 | Kashyap | 709/227 |
| 7,088,727 | B1 | * | 8/2006 | Short et al. | 370/401 |
| 7,116,634 | B1 | | 10/2006 | Hanselmann | 370/219 |
| 7,251,745 | B2 | | 7/2007 | Koch et al. | 714/11 |
| 2002/0066035 | A1 | * | 5/2002 | Dapp | 713/201 |
| 2002/0188740 | A1 | | 12/2002 | Tang et al. | 709/230 |
| 2003/0191812 | A1 | * | 10/2003 | Agarwalla et al. | 709/217 |
| 2005/0086342 | A1 | | 4/2005 | Burt et al. | 709/224 |
| 2005/0188092 | A1 | | 8/2005 | Short et al. | 709/227 |
| 2006/0090097 | A1 | | 4/2006 | Ngan et al. | 714/6 |
| 2006/0281451 | A1 | | 12/2006 | Zur | 455/422.1 |
| 2007/0189329 | A1 | * | 8/2007 | Latvala | 370/466 |
| 2008/0077686 | A1 | | 3/2008 | Subhraveti | 709/224 |
| 2008/0267101 | A1 | * | 10/2008 | Webb et al. | 370/310 |
| 2009/0083588 | A1 | * | 3/2009 | Yamashita | 714/47 |
| 2009/0126003 | A1 | * | 5/2009 | Touboul | 726/13 |
| 2009/0157882 | A1 | | 6/2009 | Kashyap | 709/227 |
| 2010/0031339 | A1 | * | 2/2010 | Minnen | 726/12 |
| 2010/0254580 | A1 | * | 10/2010 | Plamondon | 382/124 |

OTHER PUBLICATIONS

International Search Report and Written Opinion from PCT Application No. PCT/US10/59494, dated Mar. 2, 2011, 11 pages.
H. Welte, "How to replicate the fire: HA for netfilter based firewalls," Ottawa Linux Symposium, Jun. 26-29, 2002—10 pages.

(Continued)

*Primary Examiner* — Patrice Winder
*Assistant Examiner* — Tauqir Hussain
(74) *Attorney, Agent, or Firm* — Stephen T. Straub

(57) ABSTRACT

Methods and apparatuses, including computer program products, are described for transparent recovery of transport connections. The method includes collecting a state associated with a first connection between a first server and a remote server via a first network socket and transmitting the state from a first networking module to a second networking module. The method includes storing the state, opening a second network socket based on failure of the first networking module, intercepting outbound packets associated with a request to initiate a second connection between the first server and the remote server via the second socket, modifying the intercepted packets based on the state, and transmitting the modified packets to the remote server to elicit an acknowledgement to maintain the first connection. The method includes receiving packets associated with the acknowledgment from the remote server, and modifying the received packets to acknowledge the request to initiate the second connection.

21 Claims, 9 Drawing Sheets

OTHER PUBLICATIONS

R. Russell and H. Welte, "Linux netfilter Hacking HOWTO," Revision 1.14, Jul. 2, 2002, available at http://netfilter.org/documentation/HOWTO//netfilter-hacking-HOWTO.html—46 pages.

P.N. Ayuso, "NetFilter's Connection Tracking System," Login, vol. 31, No. 3 (2006)—6 pages.

"Overview of ACE," Sep. 28, 2006, available at http://www.cs.wustl.edu/~schmidt/ACE-overview.html—6 pages.

"Transmission Control Protocol," Dec. 15, 2009, available at http://en.wikipedia.org—20 pages.

* cited by examiner

600

TRANSPARENT RECOVERY OF TRANSPORT CONNECTIONS USING PACKET TRANSLATION TECHNIQUES

FIELD OF THE INVENTION

The subject matter of this application relates generally to methods and apparatuses, including computer program products, for transparent recovery of transport connections using packet translation techniques.

BACKGROUND OF THE INVENTION

Many software applications use connection-oriented transport protocols to provide communication and networking services to client devices. For example, Hypertext Transfer Protocol (HTTP) is an application-level protocol commonly used to transport web pages and related data to client web browsers. HTTP can operate, either directly or indirectly, on top of the Transport Connection Protocol (TCP). TCP is a connection-oriented protocol which provides a service to ensure proper delivery of a data stream of packets sent from one network device to another without duplication or loss of data. Since packet transfer is generally not reliable, TCP utilizes a technique known as positive acknowledgment with retransmission to guarantee reliability of packet transfers. This technique requires the receiving device to respond with an acknowledgment message as it receives the data. The sending device keeps a record of each packet it sends, and waits for acknowledgment before sending the next packet. The sending device also keeps a timer starting from when the packet was sent, and retransmits a packet if the timer expires. The timer is needed in case a packet gets lost or corrupted. Another example of a connection-oriented protocol is Stream Control Transmission Protocol (SCTP), which can be used by clients to transport Session Initiation Protocol (SIP) signaling messages for telephony or other media sessions.

Increasingly, users rely upon or expect better availability and stability of communication and networking services. Therefore, many applications have been specifically designed to handle faults at the transport layer by instantiating a new transport connection. For example, if a TCP connection is broken, a typical web browser might fail an ongoing request but will establish a new TCP connection for a retry or a new request. Similarly, a SIP Voice Over IP (VOIP) client might fail an ongoing call attempt if the TCP connection terminates but will try a new call on a different TCP connection.

Despite the ability to service future requests after a transport failure, these transport failures are not transparent to the client device. Recovery from the transport failures frequently requires action on the part of the client device and, sometimes, the user. This requirement of action by the client device or the user affects both usability of the client device and related software applications and customer perceptions of service quality. Various schemes have been attempted to provide for the transparent recovery and continuation of a transport connection after a failure. However, these attempts have required customization of the hardware, firmware, and/or networking protocol stack contained in the operating system of the device. Unfortunately, since many service providers use off-the-shelf operating system software, it is inefficient, costly, or impossible to directly modify the networking protocol stacks to provide transparent recovery and continuation.

A need therefore exists for improved methods and apparatuses for transparent recovery of transport connections.

SUMMARY

In general overview, the techniques described herein are related to transparent recovery of transport connections using packet translation techniques between a local server and a remote server without modifying an operating system associated with the local server or the remote server. The techniques allow for collecting and storing state information associated with a network socket. The techniques compensate for failure of an active networking device of the local server by enabling a backup networking device of the local server to ensure that existing transport connections are recovered without affecting usability of a client application. The techniques use a packet translation approach to connection recovery. The techniques do not require customization of the hardware, firmware, and/or networking protocol stack contained in the operating system of the device.

The invention, in one aspect, features a computerized method for transparent recovery of transport connections. The method includes collecting, at a first networking module of a first server, the state associated with a first connection between the first server and a remote server via a first network socket of the first networking module. The method also includes transmitting, by the first networking module, the state associated with the first connection to a second networking module. The method also includes storing, at the second networking module, the state associated with the first connection. The method also includes opening, by the second networking module, a second network socket based on detecting a failure of the first networking module. The method also includes intercepting, at the second networking module, outbound packets associated with a request to initiate a second connection between the first server and the remote server via the second network socket. The method also includes modifying, by one or more packet translator modules of the second networking module, the intercepted packets based on the state associated with the first connection stored at the second networking module. The method also includes transmitting, by the second networking module, the modified packets to the remote server to elicit an acknowledgement from the remote server to maintain the first connection between the first server and the remote server via the second network socket. The method also includes receiving, by the second networking module, packets associated with the acknowledgement from the remote server in response to the modified packets transmitted by the second networking module. The method also includes modifying, by the one or more packet translator modules of the second networking module, the received packets to acknowledge the request to initiate the second connection between the first server and the remote server via the second network socket.

The invention, in another aspect, features a system for transparent recovery of transport connections. The system includes a first networking module of a first server configured to collect the state associated with a first connection between the first server and a remote server via a first network socket of the first networking module. The first networking module is also configured to transmit the state associated with the first connection to a second networking module of the system. The second networking module is configured to store the state associated with the first connection. The second networking module is also configured to open a second network socket based on detecting a failure of the first networking module. The second networking module is also configured to intercept outbound packets associated with a request to initiate a second connection between the first server and the remote server via the second network socket. The second networking module also comprises one or more packet translator modules configured to modify the intercepted packets based on the state associated with the first connection stored at the second networking module. The second networking module is also configured to transmit the modified packets to the remote server to elicit an acknowledgement from the remote server to maintain the first connection between the first server and the remote server via the second network socket. The second networking module is also configured to receive packets associated with the acknowledgement from the remote server in response to the modified packets transmitted by the second networking module. The one or more packet translator modules of the second networking module are also configured to modify the received packets to acknowledge the request to initiate the second connection between the first server and the remote server via the second network socket.

The invention, in another aspect, features a system for transparent recovery of transport connections. The system includes means for collecting, at a first networking module of a first server, the state associated with a first connection between the first server and a remote server via a first network socket of the first networking module. The system also includes means for transmitting, by the first networking module, the state associated with the first connection to a second networking module. The system also includes means for storing, at the second networking module, the state associated with the first connection. The system also includes means for opening, by the second networking module, a second network socket based on detecting a failure of the first networking module. The system also includes means for intercepting, at the second networking module, outbound packets associated with a request to initiate a second connection between the first server and the remote server via the second network socket. The system also includes means for modifying, by one or more packet translator modules of the second networking module, the intercepted packets based on the state associated with the first connection stored at the second networking module. The system also includes means for transmitting, by the second networking module, the modified packets to the remote server to elicit an acknowledgement from the remote server to maintain the first connection between the first server and the remote server via the second network socket. The system also includes means for receiving, by the second networking module, packets associated with the acknowledgement from the remote server in response to the modified packets transmitted by the second networking module. The system also includes means for modifying, by the one or more packet translator modules of the second networking module, the received packets to acknowledge the request to initiate the second connection between the first server and the remote server via the second network socket.

The invention, in another aspect, features a computer program product, tangibly embodied in a computer-readable storage medium, for transparent recovery of transport connections. The computer program product includes instructions operable to cause a data processing apparatus to collect the state associated with a first connection between a first server and a remote server via a first network socket of a first networking module. The computer program product also includes instructions operable to cause a data processing apparatus to transmit the state associated with the first connection to a second networking module. The computer program product also includes instructions operable to cause a data processing apparatus to store the state associated with the first connection at the second networking module. The computer program product also includes instructions operable to cause a data processing apparatus to open a second network socket at the second networking module based on a failure of the first networking module. The computer program product also includes instructions operable to cause a data processing apparatus to intercept outbound packets associated with a request to initiate a second connection between the first server and the remote server via the second network socket. The computer program product also includes instructions operable to cause a data processing apparatus to modify the intercepted packets based on the state associated with the first connection stored at the second networking module. The computer program product also includes instructions operable to cause a data processing apparatus to transmit the modified packets to the remote server to elicit an acknowledgement from the remote server to maintain the first connection between the first server and the remote server via the second network socket. The computer program product also includes instructions operable to cause a data processing apparatus to receive packets associated with the acknowledgement from the remote server in response to the modified packets transmitted by the second networking module. The computer program product also includes instructions operable to cause a data processing apparatus to modify the received packets to acknowledge the request to initiate the second connection between the first server and the remote server via the second network socket.

In some embodiments, any of the above aspects can include one or more of the following features. The first networking module includes one or more packet translation modules. In some embodiments, installation of the one or more packet translator modules of the first networking module does not modify an operating system associated with the first networking module, and installation of the one or more packet translator modules of the second networking module does not modify an operating system associated with the second networking module. The one or more packet translator modules of the first networking module can be implemented as network filters invoked by the operating system associated with the first networking module when processing a packet, and the one or more packet translator modules of the second networking module can be implemented as network filters invoked by the operating system associated with the second networking module when processing a packet. Alternatively, the one or more packet translator modules of the first networking module can be implemented as a network device driver which transfers packets between the network and the operating system associated with the first networking module, and the one or more packet translator modules of the second networking module can be implemented as a network device driver which transfers packets between the network and the operating system associated with the second networking module.

In some embodiments, a first software application tangibly embodied in the second networking module detects failure of the first networking module. The first software application can be a middleware application. The first software application can be an end-user software application. The first software application can be an operating system.

In some embodiments, transmitting the state associated with the first connection to the second networking module is based on a period of inactivity on the first connection between the first server and the remote server. In some embodiments, transmitting the state occurs at predetermined time intervals, is based on the number of bytes transmitted on the first connection, is based on the number of bytes received on the first connection, or any combination thereof. The second networking module is a copy of the first networking module. The second networking module is located on the first server or a second server.

In some embodiments, the network transport protocol is TCP. The state associated with the first connection can include a source IP address, a destination IP address, a source port, a destination port, a send sequence number, and a receive sequence number. The packets associated with the request to initiate the second connection between the first server and the remote server via the second network socket can include a TCP connect sequence. The packets associated with maintaining the first connection between the first server and the remote server via the second network socket can include a TCP keepalive sequence.

In some embodiments, modifying the intercepted packets includes translating a first send sequence number of the intercepted packets into a second send sequence number based on the state associated with the first connection stored at the second networking module. Modifying the intercepted packets can include translating a first receive sequence number of the intercepted packets into a second receive sequence number based on the state associated with the first connection stored at the second networking module. Modifying the received packets can include translating a first send sequence number of the received packets into a second send sequence number associated with the request to initiate the second connection between the first server and the remote server via the second network socket. Modifying the received packets can include translating a first receive sequence number of the received packets into a second receive sequence number associated with the request to initiate the second connection between the first server and the remote server via the second network socket.

In some embodiments, modifying the intercepted packets includes translating a packet of the intercepted packets comprising a SYN flag and no ACK flag into a packet comprising an ACK flag and no SYN flag. Modifying the received packets can include translating a packet of the received packets comprising an ACK flag and no SYN flag into a packet comprising a SYN flag and an ACK flag.

Any of the embodiments described herein can contain one or more of the following advantages. In some embodiments, the second networking module recovers the first connection between the first server and the remote server without requiring action from the client device or the user of the client device. As a result, greater availability and reliability of both the end-user software application and the transport connection between the first server and the remote server can be achieved.

In some embodiments, the techniques described herein do not require changes to the operating system and/or networking stack of the first or second server, changes to the operating system and/or networking stack of any remote server, or any external hardware or software. As a result, subsequent upgrades or revisions to the operating system and networking stack of the first server, the second server, and the remote server can be achieved without requiring an extensive and costly customization process.

DETAILED DESCRIPTION

Figure 1:
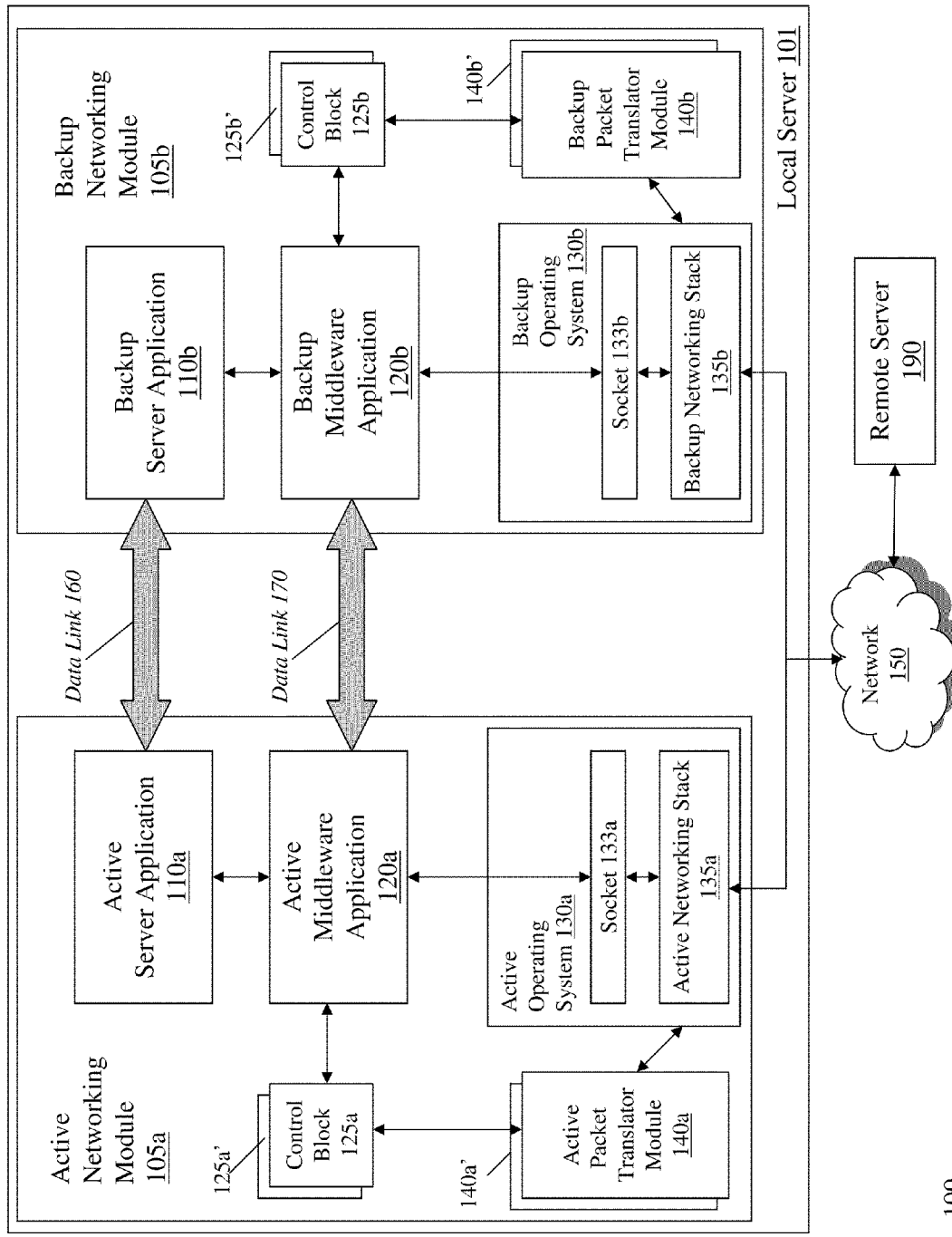
FIG. 1 is a block diagram of an exemplary system for transparent recovery of transport connections using packet translation techniques, according to an illustrative embodiment of the invention.

FIG. 1 is a block diagram of an exemplary system 100 for transparent recovery of transport connections using packet translation techniques, according to an illustrative embodiment of the invention. The system 100 includes a local server 101, a network 150, and a remote server 190. The local server 101 includes an active networking module 105a and a backup networking module 105b. The active networking module 105a includes an active server application 110a, an active middleware application 120a, active control blocks 125a, 125a', an active operating system 130a with a socket 133a and an active networking stack 135a, and active packet translator modules 140a, 140a'. The backup networking module 105b includes a backup server application 110b, a backup middleware application 120b, backup control blocks 125b, 125b', a backup operating system 130b with a socket 133b and a backup networking stack 135b, and backup packet translator modules 140b, 140b'. In some embodiments, the active networking module 105a and the backup networking module 105b are software-based or hardware-based virtual partitions located on a single physical device (e.g., a network card) in the local server 101. The active networking module 105a and the backup networking module 105b can be alternatively contained within different physical devices (e.g., different network cards) in the local server 101. The active networking module 105a and the backup networking module 105b can be alternatively distributed across different computing devices (e.g., multiple servers). The components 110a-b, 120a-b, 125a-b, 125a'-b', 130a-b, 135a-b, 140a-b, 140a'-b' of the active networking module 105a and the backup networking module 105b can include software, firmware, hardware, or any combination thereof.

The local server 101 communicates with a remote server 190 via a communications network 150. The network 150 can be implemented as, for example, a local network (e.g., LAN) or a wide area network (e.g., Internet), or a combination thereof.

The backup networking module 105b provides the same application-based and network-based services as the active networking module 105a. In the event that the active networking module 105a fails, the backup networking module 105b assumes management and control of the application-based and network-based services. In some embodiments, a single backup networking module (e.g., backup networking module 105b) serves as the backup for any number of active networking modules (e.g., active networking module 105a). Under this embodiment, the single backup networking module (e.g., backup networking module 105b) receives synchronization data (e.g., a state associated with a transport connection) from all of the active networking modules, and only utilizes data associated with a failed active networking module when required.

In some embodiments, the components 110b, 120b, 125b, 125b', 130b, 133b, 135b, 140b, 140b' of the backup networking module 105b are functionally equivalent to the corresponding components 110a, 120a, 125a, 125a', 130a, 133a, 135a, 140a, 140a' of the active networking module 105a. Typically, while the active networking module 105a is in use, the components of the backup networking module 105b do not make networking requests or receive packets from remote servers (e.g., remote server 190) on the network 150. Also, while the active networking module 105a is in use, the socket 133b has not been created. However, the backup networking module 105b is still available for interaction with the active networking module 105a.

The active server application 110a and the backup server application 110b are the users of the network services. The active server application 110a and, upon activation, the backup server application 110b, originate transport connections to the remote server 190 and accept transport connections from the remote server 190. The active server application 110a and the backup server application 110b create sockets (e.g., sockets 133a-b) by issuing socket requests to the active operating system 130a and backup operating system 130b, respectively. The sockets 133a-b are endpoints of transport connections between the local server 101 and the remote server 190 and comprise the IP addresses and transport port numbers of the ends of the transport connection. The active operating system 130a and backup operating system 130b map the sockets 133a-b to a process or thread of the active server application 110a and backup server application 110b. When the active operating system 130a and backup operating system 130b receive data on a transport connection, the active operating system 130a and backup operating system 130b identify the socket (e.g., sockets 133a-b) for which the data is intended by extracting the socket IP addresses and transport port numbers from the data.

In some embodiments, the active server application 110a and the backup server application 110b can comprise a single server application connected to both the active middleware application 120a and the backup middleware application 120b. In one example, this single server application connected to both the active middleware application 120a and the backup middleware application 120b is high-availability, i.e., the application is capable of continuing to function without interruption upon failure of the active networking module 105a and after the backup networking module 105b takes over, provided that the network services and connections associated with the single server application are still available.

The active server application 110a and the backup server application 110b can communicate with each other via a data link 160. The data link 160 can be a physical or logical connection over which data can be transmitted. The data link 160 can be used to transmit synchronization data between the active server application 110a and the backup server application 110b.

Generally, a server application (e.g., server applications 110a-b) interfaces with an intermediate network services layer (e.g., middleware applications 120a-b) to ensure portability between different operating systems (e.g., operating systems 130a-b). The intermediate networking services layer translates instructions received from the server application into the appropriate networking primitives for the specifically-implemented operating systems. A primitive is a low-level function (e.g., an arithmetic, logical, or networking operation) built into an operating system, usually for speed of execution. Different operating systems generally employ different primitives for the same or similar functionality. As a result, the translation capability of the networking services layer allows a single server application to run on many operating systems without requiring customization of the server application to account for the primitives of each different operating system. An example of a commonly-used middleware application is the Adaptive Communications Framework (ACE™) from Douglas Schmidt and his research group at Washington University, University of California-Irvine, and Vanderbilt University.

The use of a middleware application (e.g., middleware application 120a-b) is but one method of providing modified networking services to the server application (e.g., server applications 110a-b). In some embodiments, a standard system library for networking calls associated with the server applications 110a-b is replaced with a modified system library. The modified system library provides networking calls using the original names but containing additional functionality. The server applications 110a-b link to the modified system library when invoking networking calls directed to the operating systems 130a-b. This approach requires no change to the source code of the server applications 110a-b. Additionally, this approach requires no change to the operating systems 130a-b.

The active middleware application 120a manages the active transport connections between the active server application 110a and the active operating system 130a. When the active server application 110a requests the initiation or acceptance of a transport connection, the active middleware application 120a collects a connection state associated with the transport connection. In some embodiments, the connection state comprises attributes (e.g., IP address, port number, socket identifier, connectivity status) associated with the transport connection. The active middleware application 120a updates the connection state associated with the transport connection as packets are transmitted or received using the transport connection.

The active middleware application 120a and the backup middleware application 120b utilize one or more control blocks 125a, 125a', 125b, 125b' for storage of the connection state and related data. In some embodiments, the control blocks 125a-b comprise data structures resident in a memory location (e.g., database, RAM, processor cache) of the respective networking modules 105a-b. In some embodiments, each of the control blocks contains connection state information for a different socket. For example, the active middleware application 120a creates control block 125a to store connection state information for socket 133a.

The active middleware application 120a is connected to the backup middleware application 120b via a data link 170. The data link 170 can be a physical or logical connection over which data can be transmitted. In some embodiments, the active middleware application 120a transmits data (e.g., the connection state associated with a transport connection) using the data link 170 to the backup middleware application 120b. This technique, also called checkpointing, ensures that both the active and backup middleware applications 120a-b contain synchronized data in their respective control blocks 125a, 125a', 125b, 125b' so that the backup middleware application 120b is able to assume management of the transport connection if failure of any one of the active components (e.g., the active server application 110a, the active middleware application 120b, and the active networking stack 135a) occurs. In one embodiment, the active middleware application 120a transmits the connection state associated with a transport connection to the backup middleware application 120b after a certain period of inactivity. In another embodiment, the active middleware application 120a transmits the connection state at periodic time intervals (e.g., every ten seconds). In yet another embodiment, the active middleware application 120a transmits the connection state associated with a transport connection to the backup middleware application 120b based on predetermined criteria (e.g., a number of bytes transmitted or received by the active middleware application 120a).

Generally, the operating system (e.g., active operating system 130a) is the central interface between the hardware and the software of the computing device (e.g., local server 101) on which the operating system resides. The operating system is responsible for coordination, management, and sharing of both physical and virtual resources for applications (e.g., active server application 110a, active middleware application 120a) executing on the computing device (e.g., local server 101). Common operating systems include BSD, Linux, SunOS (Solaris/OpenSolaris), and Windows® (NT/XP/Vista/7).

The active operating system 130a also includes an active networking stack 135a which enables the local server 101 to communicate with the network 150. Typically, the active networking stack 135a utilizes the TCP/IP protocol, but other examples include the SCTP/IP protocol, non-IP protocol stacks such as Systems Network Architecture (SNA), and stacks based on the Open Systems Interconnection (OSI) network model.

Figure 2:
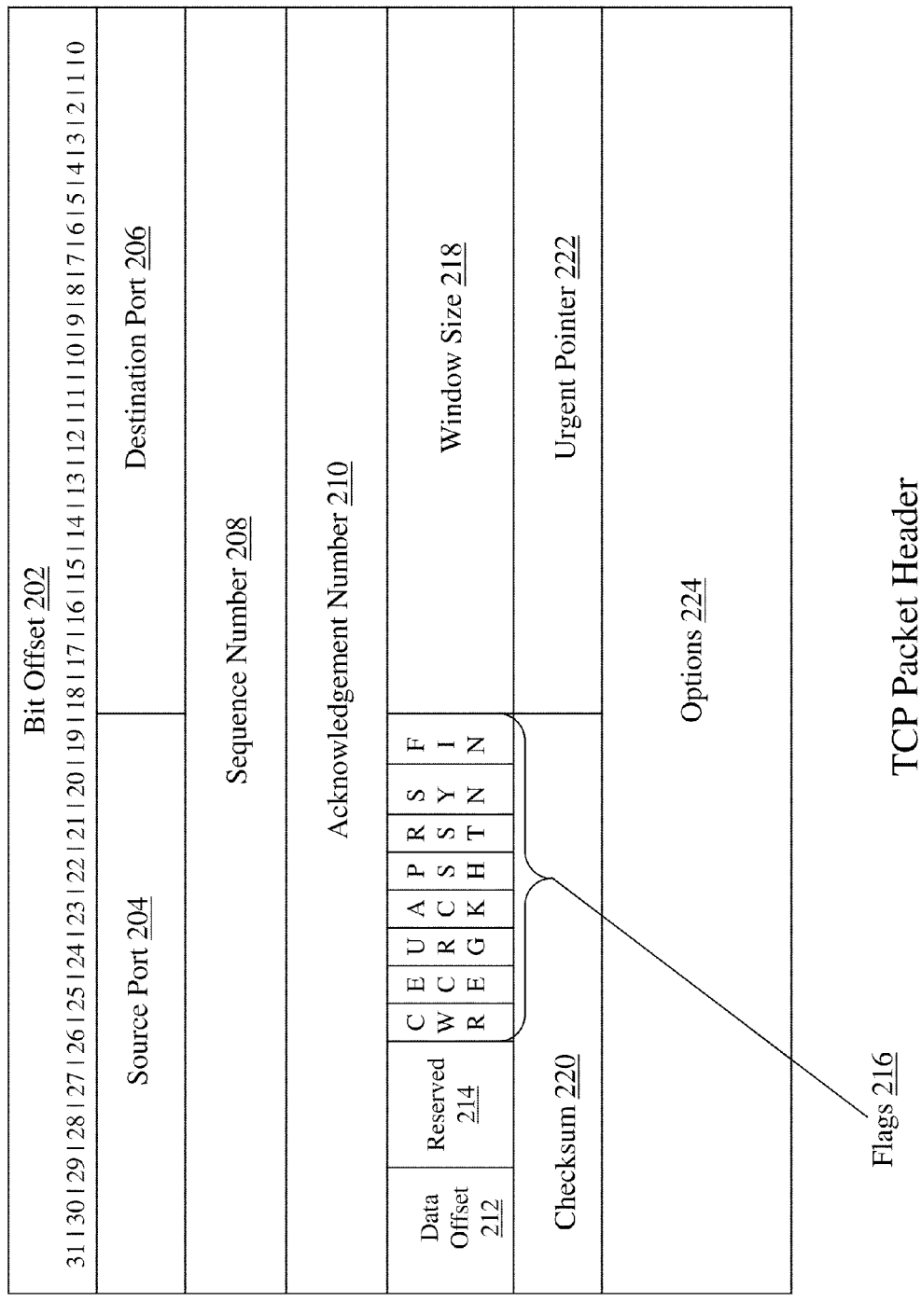
FIG. 2 is a diagram of a TCP packet header.

The description herein uses TCP as an illustrative transport protocol, so some background on the operation of TCP over IP is necessary. Principles of the present invention are, however, similarly applicable to other protocols. FIG. 2 is a diagram of a TCP packet header 200. The fields of the TCP packet header 200 are the source port field 204, the destination port field 206, the sequence number field 208, the acknowledgement number field 210, the data offset field 212, the reserved space field 214, the flags 216, the window size field 218, the checksum field 220, the urgent pointer field 222, and the options field 224. The source port field 204 and the destination port field 206 are the local and remote port numbers, respectively, of the entity (e.g., local server 101 of FIG. 1) transmitting the packet. The sequence number field 208 is the sequence number of the first byte of data in the packet if the packet has payload data, or the sequence number of the next byte of data that will be sent if the packet does not have payload data. The acknowledgement number field 210 is the sequence number of the next byte that the transmitting entity (e.g., local server 101 of FIG. 1) expects to receive from the receiving entity (e.g., remote server 190 of FIG. 1). The acknowledgment number field 210 is the sequence number of the last byte of received data, incremented by one. As a result, when the receiving entity (e.g., remote server 190 of FIG. 1) receives the packet, the receiving entity checks the acknowledgment number field 210 of the packet against the receiving entity's internal sequence number to ensure consistency and validity of the communication sequence. The data offset field 212 is the offset to the first byte of data and represents the length of the TCP header. The flags 216 (also called control bits) are as follows:

CWR—the Congestion Window Reduced flag. This flag is set by the transmitting entity (e.g., active module 105a of FIG. 1) to indicate that it received a TCP segment with the ECE flag set and had responded in congestion control mechanism.

ECE—the ECN-Echo flag. If the SYN flag is set, then the ECN-Echo flag indicates that the transmitting entity is Explicit Congestion Notification (ECN) enabled.

URG—the Urgent Pointer flag. This flag indicates that the Urgent Pointer field 222 is in use.

ACK—the Acknowledgement flag. This flag indicates that the Acknowledgement Number field 210 is significant. All packets after the initial SYN packet sent by the transmitting entity (e.g., active module 105a of FIG. 1) should have the ACK flag set.

PSH—the Push Function flag. This flag indicates to the receiving entity (e.g., a remote server on the network 150 of FIG. 1) to transmit all buffered data intended for the transmitting entity (e.g., active module 105a of FIG. 1).

RST—the Reset flag. This flag indicates that the connection will be reset.

SYN—the Synchronize Sequence Numbers flag. Only the first packet transmitted from the transmitting entity (e.g., active module 105a of FIG. 1) and the receiving entity (e.g., a remote server on the network 150 of FIG. 1) should have this flag set.

FIN—the Finished flag. This flag indicates that no more data will be transmitted by the transmitting entity (e.g., active module 105a of FIG. 1).

The window size field 218 indicates the number of bytes that the transmitting entity is willing to accept. The checksum field 220 is used for error-checking of the header and payload data. The urgent pointer field 222 gives the offset from the sequence number indicating the last urgent data byte if the URG flag is set. Options 224, if any, are just before the payload data.

Figure 3:
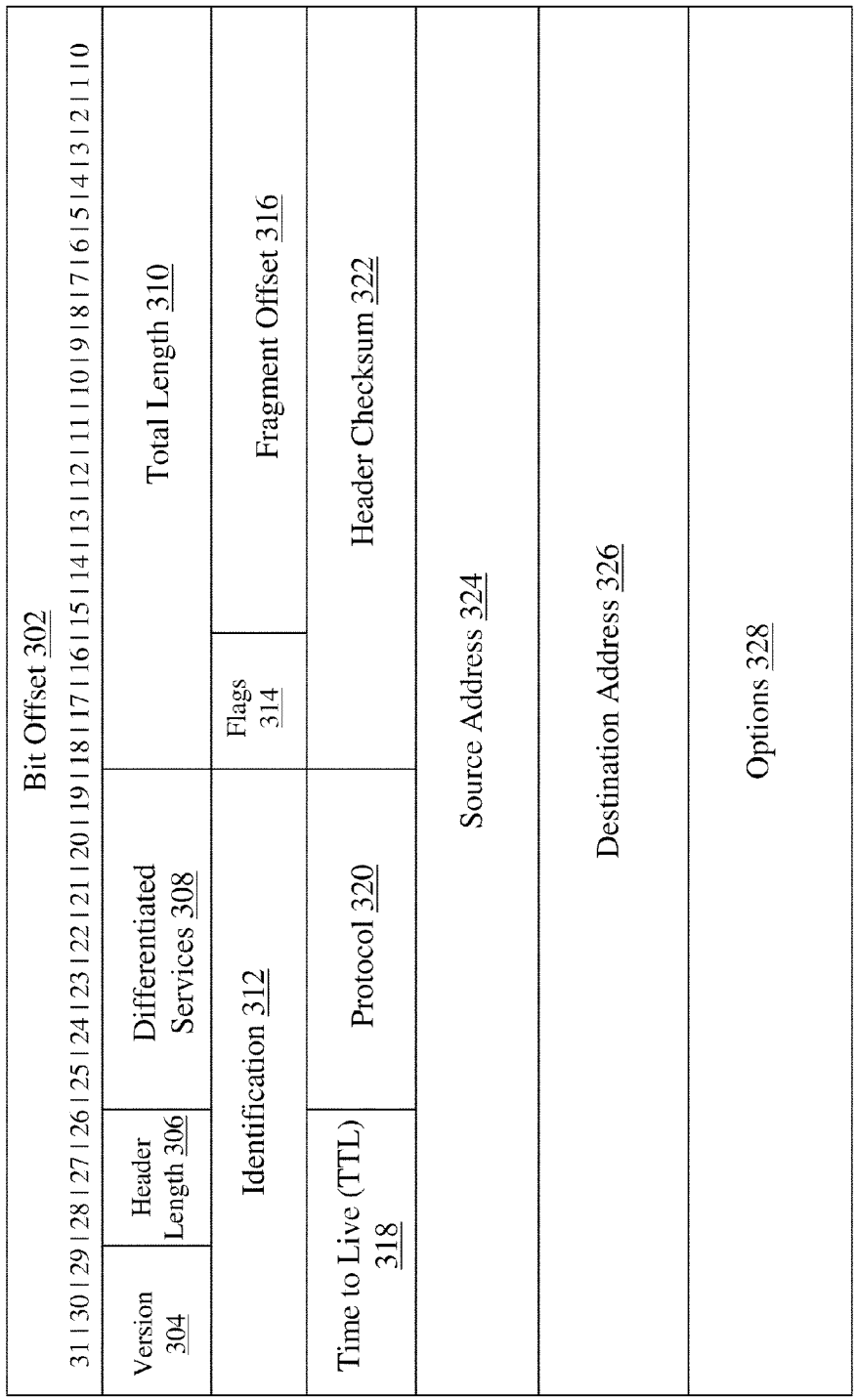
FIG. 3 is a diagram of an IP packet header.

FIG. 3 is a diagram of an IP packet header 300 using IP version 4. Currently, there are two actively deployed versions of IP: versions 4 and 6. The IP packet header 300 immediately precedes the TCP header 200. The IP header 300 contains the version field 304, the header length field 306, the differentiated services field 308, the total length field 310, the identification field 312, the flags 314, the fragment offset field 316, the time to live (TTL) field 318, the protocol field 320, the header checksum field 322, the source IP address field 324, the destination IP address field 326, and the options field 328.

Figure 4:
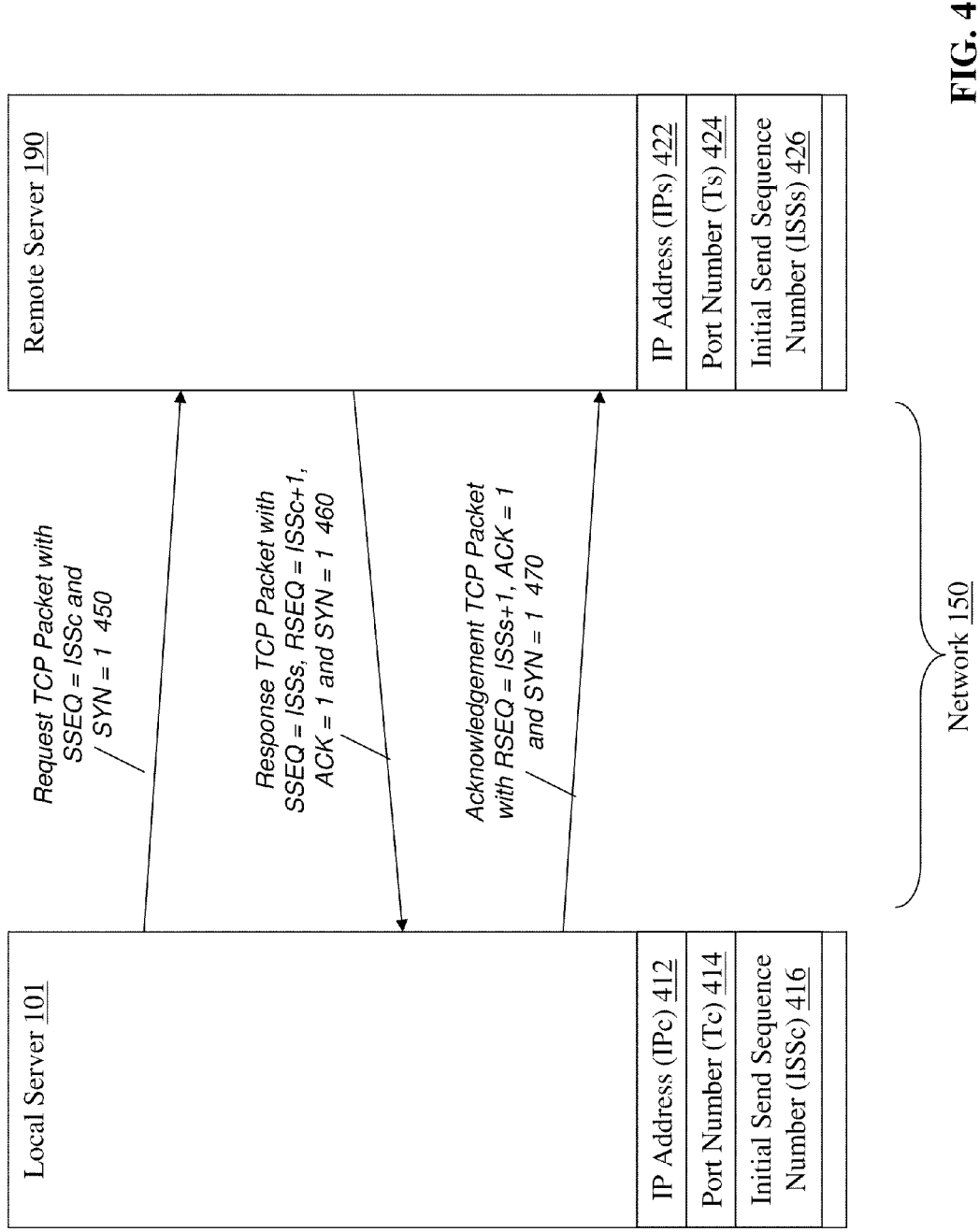
FIG. 4 is a ladder diagram of the establishment of a TCP connection between the local server and the remote server.

FIG. 4 is a flow diagram 400 in which a TCP connection is established between the local server 101 and the remote server 190 over the network 150. The establishment of a TCP connection is often referred to as a three-way handshake. The local server 101 has a local IP address IPc 412 and a local TCP port number Tc 414. The remote server 190 has a remote IP address IPs 422 and a remote TCP port number Ts 424. The local server 101 attempts to connect to the remote server 190. The local server 101 selects an initial send sequence number ISSc 416, and transmits a request TCP packet 450 with the sequence number field (e.g., sequence number field 208 of FIG. 2) equal to the ISSc 416, and the SYN flag (e.g., the SYN flag of the flags 216 of FIG. 2) set to 1. The source IP address (e.g., source IP address field 324 of FIG. 3) of the IP header (e.g., IP header 300 of FIG. 3) is the local IP address IPc 412, the source port (e.g., source port field 204 of FIG. 2) of the TCP header (e.g., TCP header 200 of FIG. 2) is the local port number Tc 414, the destination IP address (e.g., destination IP address field 326 of FIG. 3) in the IP header (e.g., IP header 300 of FIG. 3) is the remote IP address IPs 422, and the destination port (e.g., destination port field 206 of FIG. 2) of the TCP header (e.g., TCP header 200 of FIG. 2) is the remote port number Ts 424. If the remote server 190 is listening on a socket (not shown) identified in the request TCP packet and is willing to accept the connection, then the remote server 190 transmits a response TCP packet 460. In the response TCP packet 460, the IP and TCP addressing is reversed (e.g., the source IP address of the IP header is the remote IP address IPs 422). The SYN flag (e.g., SYN flag of the flags 216 of FIG. 2) and the ACK flag (e.g., ACK flag of the flags 216 of FIG. 2) of the response TCP packet 460 are set to 1. The remote server 190 selects its own initial send sequence number ISSs 426 and sets the sequence number field (e.g., sequence number field 208 of FIG. 2) equal to its own initial send sequence number ISSs 426. The remote server 190 also sets the acknowledgement number (e.g., acknowledgement number field 210 of FIG. 2) of the TCP response packet 460 to one more than the initial send sequence number ISSc 416 received from the local server 101. Upon receiving the response TCP packet 460, the local server 101 transmits an ACK packet 470 to the remote server 190. In the ACK packet 470, the acknowledgement number (e.g., acknowledgement number field 210 of FIG. 2) is set to one more than the sequence number received in the response TCP packet 460.

Operating systems use different primitives for exposing the networking functionality of the transport protocol (e.g., TCP/IP). Some common primitives models are the BSD-style socket interface, the AT&T® streams interface, and the Microsoft® WinSock model.

In the BSD-style socket interface, the primitives for connection-oriented transport are socket( ) bind( ) listen( ) accept( ) connect( ) poll( ) send( ) recv( ), and close( ). The socket( ) call creates a network endpoint (e.g., socket 133a) and returns an identifier for the network endpoint. The bind ( ) call associates a local network address (e.g., IP address) and port number with the socket 133a. In some embodiments, the network address and/or port number are either explicitly requested by the application (e.g., active server application 110a) or selected by the operating system (e.g., active operating system 130a). The listen( ) and accept( ) calls are used to passively open connections. The listen( ) call puts the socket 133a into a mode whereby the application (e.g., active server application 110a) will be notified when a remote server 190 on the network 150 issues a connect( ) call, and the accept( ) call allows the application (e.g., active server application 110a) to complete establishment of the received connection. The connect( ) call is used to actively open, i.e. initiate, a new connection and a new socket 133a. The poll( ) call allows the application to determine whether there is activity on the socket 133a. The send( ) and recv( ) calls are used to send and receive data, respectively, on the socket 133a. Finally, close( ) terminates a socket 133a connection.

Many networking stacks allow a user to define and install one or more packet translator modules (e.g., active packet translator modules 140a, 140a') which can be invoked by the networking stack (e.g., active networking stack 135a). The active packet translator modules 140a, 140a' can be invoked before delivering a packet received from the middleware application (e.g., active middleware application 120a) to the network (e.g., network 150) via the transport protocol (e.g., TCP/IP), and after receiving a packet from the network (e.g., network 150) via the transport protocol. A packet is a unit of data formatted for transmission over a communications network (e.g., network 150). A packet generally contains metadata and a payload. The packet metadata comprises attributes related to the packet (e.g., arrival information, destination information, origin information, encoding protocols, or structure of information in the packet). The payload contains the user data to be transmitted.

In some embodiments, the active and backup packet translator modules 140a, 140a', 140b, 140b' are user-created software modules invoked by the operating systems (e.g., active operating system 130a, backup operating system 130b) during the receipt and transmittal of packets. However, invocation of the active and backup packet translator modules 140a, 140a', 140b, 140b' does not require any modification of the underlying operating system. Instead, the packet translator modules are kernel-loadable modules (KLMs) which are incorporated into a packet filtering and/or translation framework. One example of a packet translation framework is the NetFilter module in the Linux 2.4 and 2.6 operating systems. For Internet Protocol version 4 (IPv4), the NetFilter framework provides interfaces for installing packet translator modules at five different points in packet processing.

The packet translator modules 140a, 140a', 140b, and 140b' match packets to a transport connection based on the packet contents and various metadata associated with the packet. The packet translator modules optionally modify the packet (or portions of the packet) before the networking stack (e.g., networking stacks 135a, 135b) continues processing the packet. In some embodiments, the metadata is any data associated with the context of the packet including data pertaining to transmission and/or arrival of the packet (e.g., the network interface on which the packet arrived, the network interface on which the packet will be transmitted, protocol header information, application tags, VLAN information).

Figure 5:
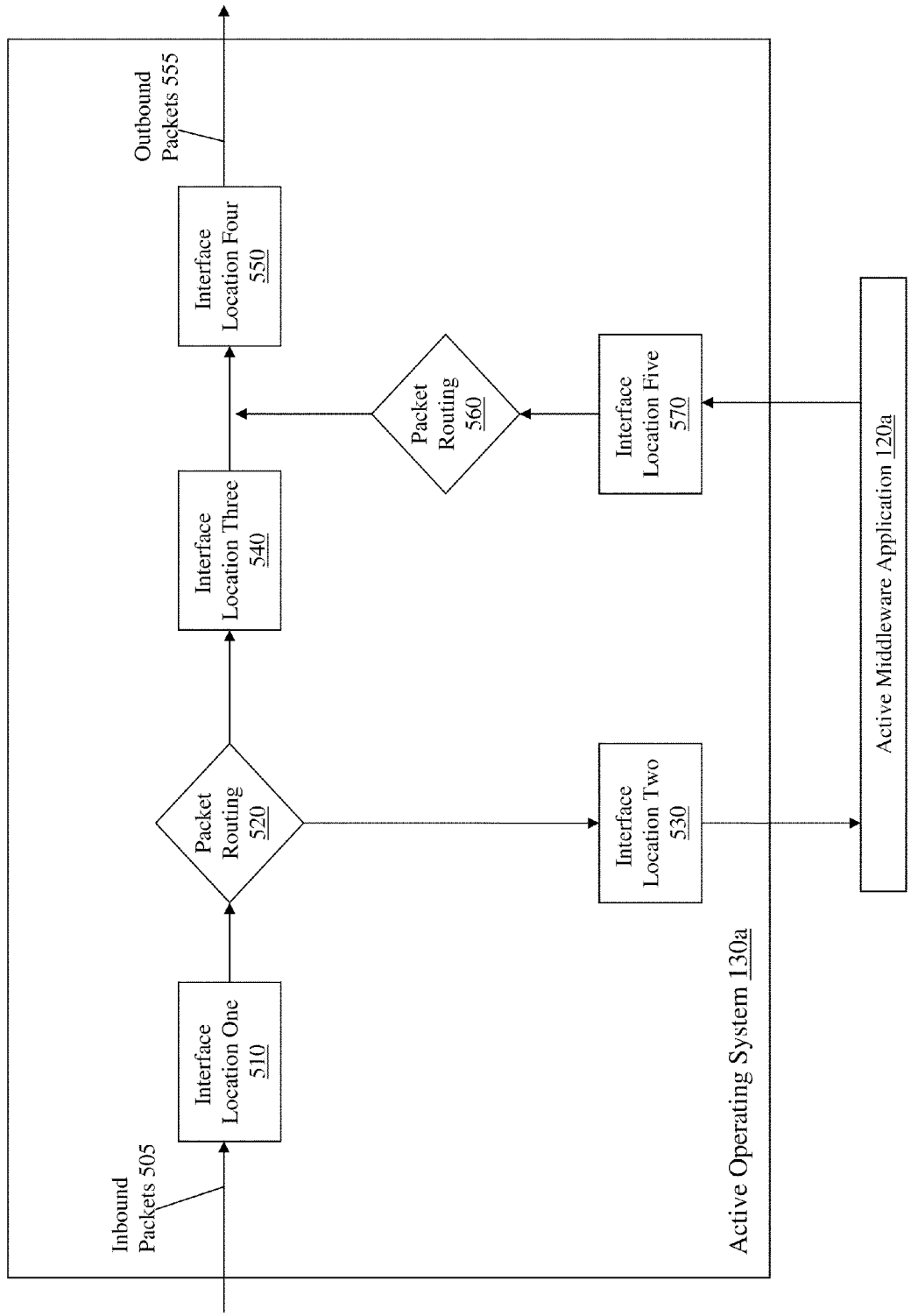
FIG. 5 is a block diagram of packet translator interface locations for an operating system.

FIG. 5 is a block diagram 500 illustrating operating system (e.g., operating systems 130a-b of FIG. 1) interface locations for packet translator modules (e.g., packet translator modules 140a, 140a', 140b, 140b' of FIG. 1). The example shown is based on the Linux NetFilter framework but the general concept applies to other platforms and frameworks. The operating system (e.g., active operating system 130a) receives inbound packets 505 from the network (e.g., network 150 of FIG. 1). Interface Location One 510 corresponds to the initial receipt of the inbound packets 505 after the inbound packets 505 have passed basic validation checks (e.g., the packets are not truncated, the checksum field of each packet header correctly validates the contents of that packet) conducted by the active operating system 130a. The active operating system 130a transmits the inbound packets 505 to a packet routing module 520 which determines whether the packets 505 are bound for a local process (e.g., active middleware application 120a) or for external routing (e.g., to remote server 190 on the network 150 of FIG. 1). If the packet routing module 520 determines that the inbound packets 505 are intended for the active middleware application 120a, the active operating system 130a transmits the packets 505 to Interface Location Two 530. If the packet routing module 520 determines that the packets 505 are bound for external routing, the active operating system 130a transmits the packets 505 to Interface Location Three 540, and the active operating system 130a transmits the packets 505 to Interface Location Four 550 before transmitting the packets as outbound packets 555 to the network (e.g., network 150 of FIG. 1). The active operating system 130a also receives packets from a local process (e.g., active middleware application 120a) at Interface Location Five 570. The active operating system 130a transmits the packets to a packet routing module 560, which determines the destination of the packets. The active operating system 130a then transmits the packets to Interface Location Four 550 and on to the network (e.g., network 150 of FIG. 1).

The active operating system 130a can invoke packet translator modules (e.g., packet translator modules 140a, 140a' of FIG. 1) at any or all of the Interface Locations 510, 530, 540, 550, and 570. The active packet translator modules 140a, 140a' receive a copy of the packet and the metadata associated with the packet. The active packet translator modules 140a, 140a' then examine and/or modify the packet, including any part of the packet headers (e.g., TCP header 200 of FIG. 2 and IP header 300 of FIG. 3). When the active packet translator modules 140a, 140a' have completed the processing of the packet, the packet translator modules 140a, 140a' determine the disposition of the packet. The packet translator modules 140a, 140a' can return different values to specify that the processed packet should be accepted, dropped, or queued for later processing.

In embodiments of the invention involving TCP/IP packets, the packet translator modules (e.g., active packet translator modules 140a, 140a') invoked at the Interface Locations 510, 530, 540, 550, and 570 allow for: (a) matching packets with specific ports and addresses; (b) storing the contents of fields and/or flags (e.g., sequence number field 206 and/or acknowledgement number field 208 of FIG. 2) in the TCP header (e.g., TCP header 200 of FIG. 2); (c) modifying the contents of fields and/or flags (e.g., SEQ, SYN, ACK, and RST flags of the flags 216 in FIG. 3) in the TCP header (e.g., TCP header 200 of FIG. 2); or (d) transmitting stored contents to other applications (e.g., active server application 110a).

Referring to FIG. 1, in some embodiments, the active middleware application 130a and the backup middleware application 130b generate a per-socket control block (SCB) (e.g., control blocks 125a, 125a', 125b, 125b') for each socket (e.g., sockets 133a-b). The SCBs 125a, 125a', 125b, 125b' are logically separated into two parts, SCB0 and SCB1. The active middleware application 130a and the backup middleware application 130b utilize the first part, SCB0, for access to replacement socket primitives. The active middleware application 130a and the backup middleware application 130b utilize the second part, SCB1, for installation of packet translator modules 140a, 140a', 140b, 140b'.

In some embodiments, the SCB0 part of the control blocks 125a, 125a', 125b, 125b' contains the following data: sock_num, sock_num_orig, state, local_address, remote_address, local_port, remote_port, inbnd_netfilter, outbnd_netfilter. The sock_num contains the socket 133a-b identifier as known by the active operating system 130a and the backup operating system 130b. The sock_num_orig contains the socket identifier as known by the active server application 110a and the backup server application 110b. In some embodiments, the sock_num and sock_num_orig fields contain the same value in the control block 125a of the active middleware application 120a because the active middleware application 130a and active operating system 130a have created only a single socket 133a. The sock_num and sock_num_orig fields contain different values in the control block 125b of the backup middleware application 120b after the backup middleware application 120b recovers a transport connection because the backup middleware application 120b and backup operating system 130b have created a second socket 133b and the backup middleware application 120b translates packets between the socket identifiers of the two sockets 133a-b. The state contains the current connection state of the socket 133a-b (e.g., idle, listen, connected). The local_address and remote_address fields contain the IP address of the local server 101 and the IP address of the remote server 190, respectively. Similarly, the local_port and remote_port fields contain the port number of the local server 101 and the port number of the remote server 190, respectively. The inbnd_netfilter and outbnd_netfilter fields are the packet translator modules (e.g., packet translator modules 140a, 140a', 140b, 140b') for inbound and outbound packets, respectively.

The packet translator modules 140a, 140a', 140b, 140b' use a per-socket control block (e.g., control blocks 125a', 125b') for each socket (e.g., sockets 133a-b). The control blocks 125a'-b' contain local_addr, local_port, remote_addr, remote_port, state, seq_num, seq_off, and ack_num fields. The local_addr and remote_addr fields contain the IP address of the local server 101 and the IP address of the remote server 190, respectively. Similarly, the local_port and remote_port fields contain the port number of the local server 101 and the port number of the remote server 190, respectively. The state field contains the current state of the transport connection (e.g., idle, connected, halfopen, probesent). The seq_num and the ack_num fields contain the sequence number and acknowledgement number for the transport connection. The seq_off is the difference between the sequence number of the local server 101 and the sequence number of the remote server 190. Typically, the seq_off field of the active networking module 105a is equal to zero.

In some embodiments, one or more middleware routines replace each of the original socket primitives identified previously for use by the active operating system 130a. The replacement socket primitives enable the active server application 110a to invoke the original socket primitive indirectly but also perform additional actions either before, after, or both before and after invoking the original socket primitive. The additional actions involve one or more of the following actions: (a) creating control state associated with a socket (e.g., socket 133a); (b) updating or deleting control state associated with a socket (e.g., socket 133a); (c) installing a network packet translator module for a socket (e.g., socket 133a); and (d) updating or removing a network packet translator module for a socket (e.g., socket 133a). In some embodiments, the additional actions are associated with reading data from and writing data to a control block (e.g., control block 125a of the active middleware application 120a.

In this description, each of the replacement socket primitives are named 'REPLACE_xxx' where 'xxx' corresponds to the specific name of the original socket primitive. For example, the REPLACE_connect( ) primitive replaces the connect( ) primitive. The 'REPLACE_xxx' socket primitives expand the functionality of the original socket primitives of the active operating system 130a as follows:

REPLACE_socket( ) allocates and initializes a per-socket control block (e.g., control block 125a) and also creates the socket (e.g., socket 133a). Both the sock_num and sock_num_orig fields are set to the socket identifier generated by the active operating system 130a when creating the socket 133a. The state of the socket 133a is idle. The remaining fields are not initialized. The sock_num value is then returned to the caller.

REPLACE_bind( ) uses the sock_num_orig field to bind with the active operating system 130a. The operating system 130a returns values for the local IP address and port number, and those values are stored in the local_address and local_port fields of control block 125a. The status code is then returned to the caller.

REPLACE_listen( ) uses the sock_num_orig field to put the socket 133a into listen mode, updates the state information stored in control block 125a, and returns the status code to the caller.

REPLACE_accept( ) accepts a new socket 133a by invoking the accept( ) call with the sock_num_orig value, and then creates and initializes a new per-socket control block (e.g., control block 125a'). The sock_num and sock_num_orig fields are set to the new socket identifier received from the active operating system 130a. The state of the socket 133a is connected. The operating system 130a returns values for the remote IP address and remote port number, and those values are stored in the remote_address and remote_port fields of control block 125a'. REPLACE_accept( ) also installs packet translator modules INBND_CONNECTED and OUT- BND_CONNECTED (described below). An inactivity timer is started. The new socket identifier is returned to the caller.

REPLACE_connect( ) initiates a connect( ) call using the sock_num_orig value. If the socket 133*a* connects, then the state of the socket 133*a* is stored in control block 125*a'* along with the remote IP address and remote port number received from the active operating system 130*a*. REPLACE_connect( ) installs packet translator modules INBND_CONNECTED and OUTBND_CONNECTED (described below). An inactivity timer is started. The status code is returned to the caller.

REPLACE_poll( ) converts all the provided socket identifiers into the sock_num_orig values and then passes the converted values through to the active operating system 130*a*. If the active operating system 130*a* indicates that any sockets (e.g., socket 133*a*) have changed state, then the state information corresponding to the changed sockets (e.g., socket 133*a*) is stored in control block 125*a'*. If the active operating system 130*a* indicates that any sockets (e.g., socket 133*a*) have connected, then REPLACE_poll( ) installs packet translator modules INBND_CONNECTED and OUTBND_CONNECTED (described later), and starts an inactivity timer. The status code is returned to the caller.

REPLACE_send( ) invokes the active operating system 130*b* to transmit data on the socket 133*a* corresponding to the sock_num_orig value. The inactivity timer is restarted. The data and status code response are passed back to the caller.

REPLACE_recv( ) invokes the active operating system 130*b* to receive data on the socket 133*a* corresponding to the sock_num_orig value. The inactivity timer is restarted. The data and status code response are passed back to the caller.

REPLACE_close( ) closes the socket 133*a*. The packet translator modules associated with the socket 133*a*, if any, are removed. The per-socket control block 125*a'* associated with the socket 133*a* is deleted.

The active networking module 105*a* of the local server 101 utilizes two packet translator modules (e.g., active packet translator modules 140*a*, 140*a'*). The active operating system 130*a* installs the INBND_CONNECTED packet translator module (e.g., active packet translator module 140*a*) at Interface Location Two 530 of FIG. 5. The INBND_CONNECTED packet translator module 140*a* matches inbound packets using the local_addr, remote_addr, local_port, and remote_port fields. When the INBND_CONNECTED packet translator module 140*a* matches a packet to a socket 133*a*, the location of the per-socket control block (e.g., control block 125*a*) associated with the socket 133*a* is identified. The INBND_CONNECTED packet translator module 140*a* stores the sequence number field (e.g., sequence number field 208 of FIG. 2) from the packet in the ack_num field of control block 125*a*. The INBND_CONNECTED packet translator module 140*a* stores the acknowledgement number field (e.g., acknowledgement number field 210 of FIG. 2) of the packet in the seq_num field of SCB1. The INBND_CONNECTED packet translator module 140*a* does not modify the packet and instructs the active operating system 130*a* to continue normal processing of the packet.

The active operating system 130*a* installs the OUTBND_CONNECTED packet translator module (e.g., active packet translator module 140*a'*) at Interface Location Five 250 of FIG. 2. The OUTBND_CONNECTED packet translator module 140*a'* matches outbound packets using the local_addr, remote_addr, local_port, and remote_port fields.

When the OUTBND_CONNECTED packet translator module 140*a'* matches a packet to a socket 133*a*, the location of the per-socket control block (e.g., control block 125*a*) associated with the socket 133*a* is identified. The OUTBND_CONNECTED packet translator module 140*a'* stores the sequence number field (e.g., sequence number field 208 of FIG. 2) from the packet in the seq_num field of control block 125*a*. The OUTBND_CONNECTED packet translator module 140*a'* stores the acknowledgement number field (e.g., acknowledgement number field 210 of FIG. 2) of the packet in the ack_num field of control block 125*a*. The OUTBND_CONNECTED packet translator module 140*a'* does not modify the packet and instructs the active operating system 130*a* to continue normal processing of the packet.

The active networking module 105*a* in the local server 101 periodically transmits the connection state of the socket 133*a* maintained in control block 125*a* to the backup networking module 105*b*. In some embodiments, the active networking module 105*a* uses an activity timer to determine when to transmit the connection state. In some embodiments, the active networking module 105*a* transmits the connection state at fixed intervals. In some embodiments, the active networking module 105*a* transmits the connection state after a predetermined number of bytes or packets are transmitted or received via the original socket 133*a* or transport connection.

To accept a transport connection from the remote server 190, the active server application 110*a* transmits a request to the active middleware application 120*a* to open a TCP/IP socket 133*a* and bind the socket 133*a* to a local address (e.g., IP address and port number). The active server application 110*a* then begins listening for activity on the socket 133*a*. The active middleware application 120*a* transmits the request to the active operating system 130*a*, and the active operating system 130*a* issues a socket identifier (e.g., a socket number) used by the active operating system 130*a* and the active server application 110*a* to identify the socket 133*a*. The active middleware application 120*a* creates a control block 125*a* to save the socket 133*a* information (e.g., socket identifier), the local addressing information (e.g., IP address and port number), and the connection state of the socket 133*a* (e.g., listening). The active middleware application 120*a* transmits the control block 125*a* information to the backup middleware application 120*b*. At this point, the newly-created socket 133*a* is not connected to a destination (e.g., remote server 190 on the network 150).

During its normal execution, a client application (not shown) issues a TCP connect request to the active server application 110*a*. The active server application 110*a* detects the TCP connect request as activity on the listening socket 133*a*. The active server application 110*a* invokes a TCP accept sequence on the listening socket 133*a*. The active middleware application 120*a* receives the TCP accept sequence. The active middleware application 120*a* creates a control block 125*a'* for a new accept socket 133*a*, and installs one or more packet translator modules (e.g., active packet translator module 140*a*, 140*a'*) in the active operating system 130*a*. The packet translator modules 140*a*, 140*a'* are associated with the local IP address, the destination IP address, the source port number, and the destination port number of the local server 101 and the remote server 190, respectively. The active middleware application 120*a* transmits the TCP accept sequence to the active operating system 130*a*. When the active operating system 130*a* returns the new socket identifier, the active middleware application 120*a* saves the socket identifier and the local and remote addressing in the control block 125*a'* for the accept socket 133*a* and transmits the control block information to the backup middleware application 120b. The backup middleware application 120b creates a control block (e.g., control block 125b') to store the control block information received from the active middleware application 120a. The active middleware application 120a starts an activity timer and passes the accept socket data onto the active server application 110a.

In some embodiments, the packet translator modules 140a, 140a' match packets on each individual transport connection. A transport connection in the TCP protocol is identified by a unique combination (i.e., "5-tuple") of source IP address, destination IP address, source port number, destination port number, and IP protocol of TCP. Whenever the active networking stack 135a receives a TCP packet from the remote server 190 on the network 150, the active operating system 130a invokes one or more active packet translator modules 140a, 140a' to match the packet to an existing TCP connection and corresponding socket 133a before the packet is delivered to the transport layer of the networking stack 135a. Whenever the transport layer of the active networking stack 135a transmits a packet to the IP layer of the active networking stack 135a, the active operating system 130a invokes one or more active packet translator modules 140a, 140a' to match the packet to an existing TCP connection and corresponding socket 133a. The packet translator modules 140a, 140a' stores the TCP sequence numbers associated with the packets for the local server 101 and the remote server 190 in a control block (e.g., control block 125a).

When the active networking stack 135a receives packets on a TCP connection from the remote server 190 on the network 105a, the active operating system 130a invokes the middleware TCP receive command (e.g., REPLACE_recv( )) to get the packets from the active networking stack 135a and transmit the packets to the active middleware application 120a. The active middleware application 120a transmits the received packets to the active server application 110a and resets the activity timer. In some embodiments, the activity timer is reset each time packets or other data are received on a TCP connection. When the active networking module 105a transmits data using the TCP connection, the active operating system 130a invokes the middleware TCP send command (e.g., REPLACE_send( )) to transmit the packets to the active networking stack 135a. The active middleware application 120a stores the state information of the packets in a control block (e.g., control block 125a) and resets the activity timer.

Circumstances can arise, however, which result in detection of a failure at the active networking module 105a. To detect a failure at the active networking module 105a, the backup networking module 105b can periodically check the operational status of the active networking module 105a and take over if the status check fails. In another embodiment, a separate module (not shown) conducts the operational status check of the active networking module 105a and notifies the backup networking module 105b to begin recovery of transport connections. Failure of the active networking module 105a can manifest in different ways. In one embodiment, a hardware or software error causes the active networking module 105a to stop functioning normally (e.g., a crash or shutdown). Accordingly, the transport connections and sockets (e.g., socket 133a) established between the active networking module 105a at the local server 101 and the remote server 190 on the network 150 should be recovered before they are disconnected to avoid disruption to users of applications (e.g., server application 110a) which rely on the transport connections.

Figure 6:
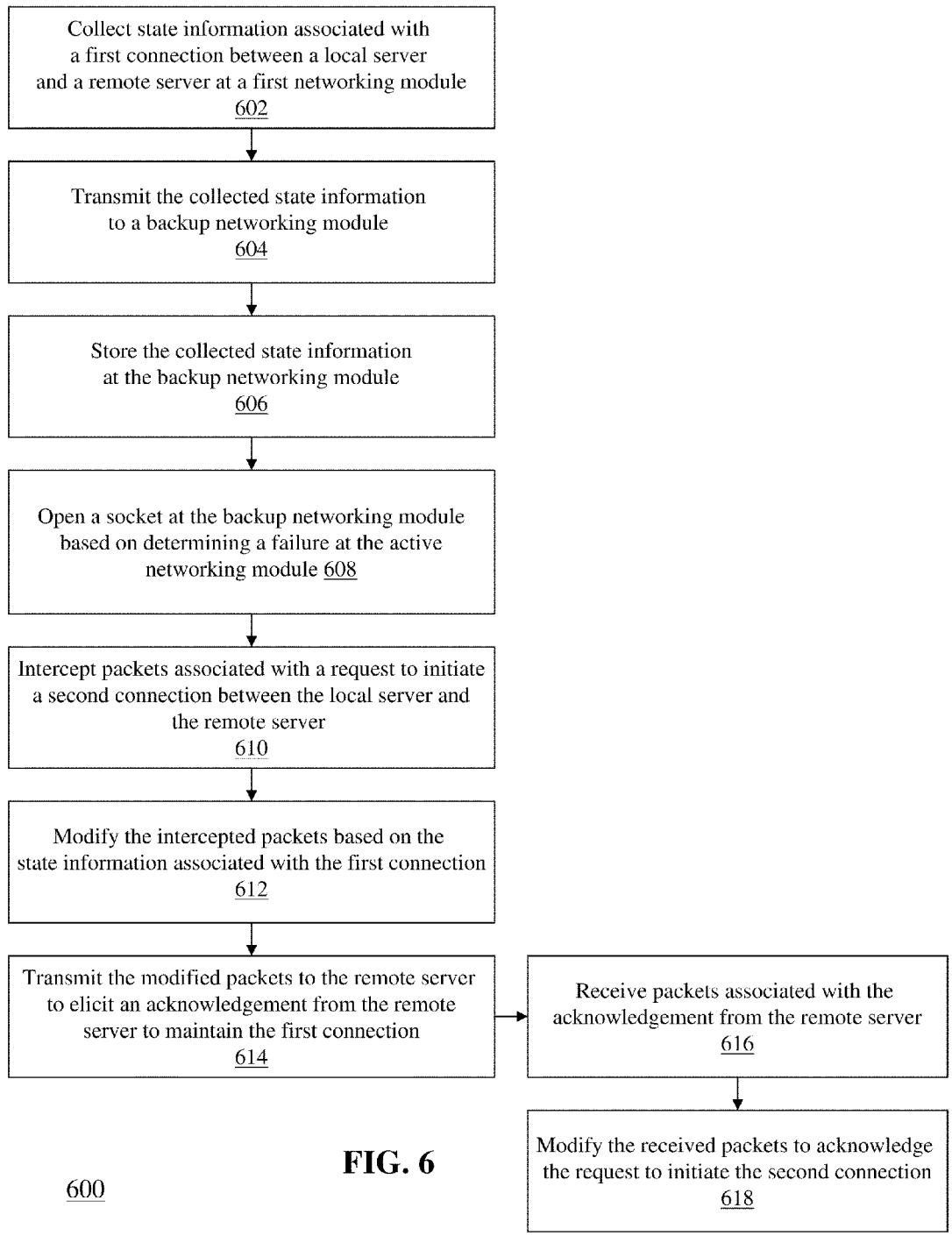
FIG. 6 is a flow diagram of an exemplary method for transparent recovery of transport connections using packet translation techniques, according to an illustrative embodiment of the invention.

FIG. 6 is a flow diagram 600 of an exemplary method for transparent recovery of transport connections using packet translation techniques in accordance with the system 100 of FIG. 1, according to an illustrative embodiment of the invention. The active networking module 105a collects (602) the state associated with a transport connection between the active networking module 105a and the remote server 190 via a network socket 133a. To collect the state, the active middleware application 120a invokes an interface to the active packet translator modules 140a, 140a' associated with the active operating system 130a. The active middleware application 120a collects the local and remote sequence numbers associated with the transport connection from the packet translator modules 140a, 140a'. The active middleware application 120a also collects the socket identifier from the control block 125a for the transport connection. The active middleware application 120a then transmits (604) the collected state information associated with the transport connection to the backup middleware application 120b using the data link 170. In some embodiments, the active server application 110a transmits synchronization data to the backup server application using the data link 160. The backup middleware application 120b stores (606) the state information received from the active middleware application 120a in a control block (e.g., control block 125b).

The backup networking module 105b determines a failure has occurred at the active networking module 105a. When the backup networking module 105b determines the failure has occurred, the individual components of the backup networking module 105b (e.g., backup server application 110b, backup middleware application 120b, backup control blocks 125b and 125b', backup operating system 130b, backup networking stack 135b) which are active/backup aware convert into active mode. In some embodiments, the backup operating system 130b or the backup networking stack 135b are not active/backup aware. Therefore, no activation is necessary or applicable for the backup operating system 130b or the backup networking stack 135b. In other embodiments, the backup operating system 130b or the backup networking stack 135b are active/backup aware.

The backup middleware application 120b attempts to recover the transport connection by first configuring a socket 133b assigned a local IP address and port number of the transport connection. The backup middleware application 120b opens (608) a new socket 133b by transmitting a middleware TCP socket command (e.g., REPLACE_socket( )) to the backup operating system 130b. The backup middleware application 120b stores the new socket identifier returned from the backup operating system 130b in the control block 125b. The backup middleware application 120b also keeps the original socket identifier received from the active middleware application 120a stored in the control block 125b. Since the socket identifiers are different, the backup middleware application 120b maps the original socket identifier (i.e. the identifier from the active middleware application 120a) to the new socket identifier (i.e. the identifier from the backup operating system 130b).

At the time of failure, the original socket 133a on the active networking module 105a can exist in one of two states: the waiting (e.g., listen) state or the connected state. For a socket 133a in the listen state, the backup middleware application 120b transmits a listen( ) command to the backup operating system 130b using the new socket 133b. If the listen( ) command succeeds, then the transport connection is fully recovered using the new socket 133b, and the backup server application 110b can utilize the transport connection as used by the active networking module 105a and the active server application 110a. The backup middleware application 120b translates between the new socket identifier (as identified by the backup server application 110b) and the original socket identifier (as identified by the backup operating system 130b and backup networking stack 135b) when coordinating the transmission of packets between layers of the backup networking stack 135b.

The backup networking module 105b also recovers sockets (e.g., socket 133a) that were in a connected state at the active networking module 105a at the time of failure. In order to recover a socket (e.g., socket 133a) that was connected at the active networking module 105a, the backup networking module 105b instructs the backup operating system 130b and the backup networking stack 135b to initiate a new transport connection and corresponding socket 133b and translates the TCP connect sequence packets associated with the connection initiation into TCP keepalive sequence packets.

To translate the TCP connect sequence, the backup middleware application 120b intercepts (610) packets associated with the request from the backup operating system 130b to initiate a second transport connection via a second socket 133b between the backup networking module 105b and the remote server 190 on the network 150 that had been connected with the active networking module 105a over the transport connection. The backup middleware application 120b retrieves the state information associated with the original socket 133a (e.g., sock_num, state, local_addr, remote_addr, local_port, remote_port, seq_num, ack_num), which the backup middleware application 120b had previously stored in the control block 125b. As previously mentioned, the backup middleware application 120b can store the state information in the SCB0 and SCB1 control structures (e.g., control blocks 125b, 125b'), or a different standby structure SBY. In one embodiment, the backup middleware application 120b starts by recreating the relevant data structures for each transport connection.

Figure 7:
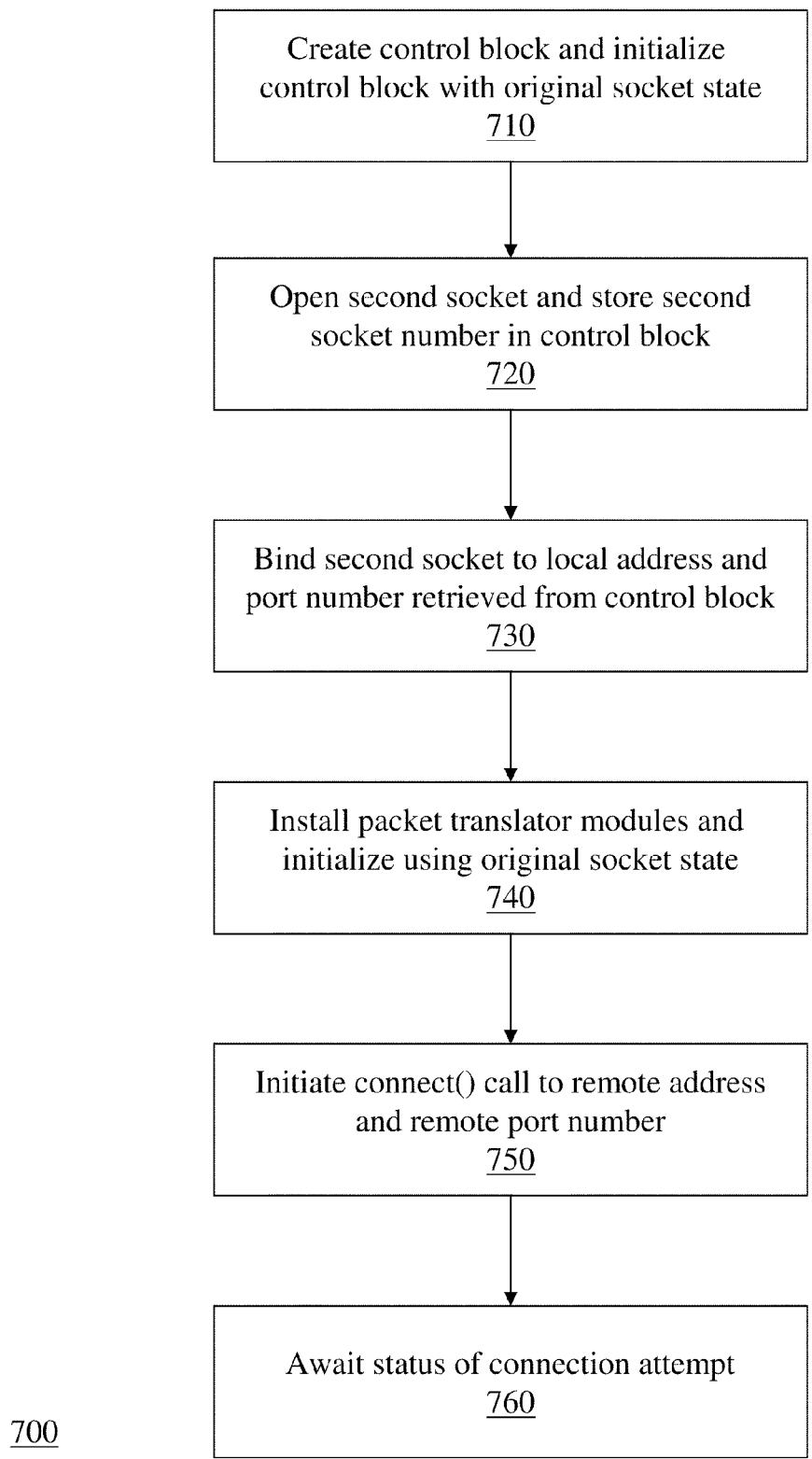
FIG. 7 is a flow diagram of an exemplary method for recreating data structures for a second socket, according to an illustrative embodiment of the invention.

FIG. 7 is a flow diagram of an exemplary method 700 for recreating data structures for a second socket, according to an illustrative embodiment of the invention. Note that this is one illustrative sequence and there are other potential orderings which result in the same outcome. Any sequence which produces the same final outcome can be considered to meet the spirit of the invention.

- Create (710) a per-socket control block (e.g., control block 125b) and initialize the control block 125b with the sock_num_orig, local_addr, remote_addr, local_port, and remote_port from the state information of the original socket 133a stored at the backup middleware application 120b. The state of the transport connection is now halfopen.
- Open (720) a second socket 133b and store the new socket number in the sock_num field of the control block 125b.
- Bind (730) the socket 133b to the local address and local port retrieved from the control block 125b.
- Install (740) INPUT_HALFOPEN and OUTPUT_HALFOPEN packet translator modules (e.g., backup packet translator modules 140b, 140b' of FIG. 1) (described later), providing the local_addr, remote_addr, local_port, remote_port, seq_num, and ack_num as initialization data. The initialization will result in a new per-socket control block (e.g., control block 125b') containing this data.
- Initiate (750) a connect( ) call to remote_addr and remote_port.
- Await (760) status of connection attempt.

Figure 8:
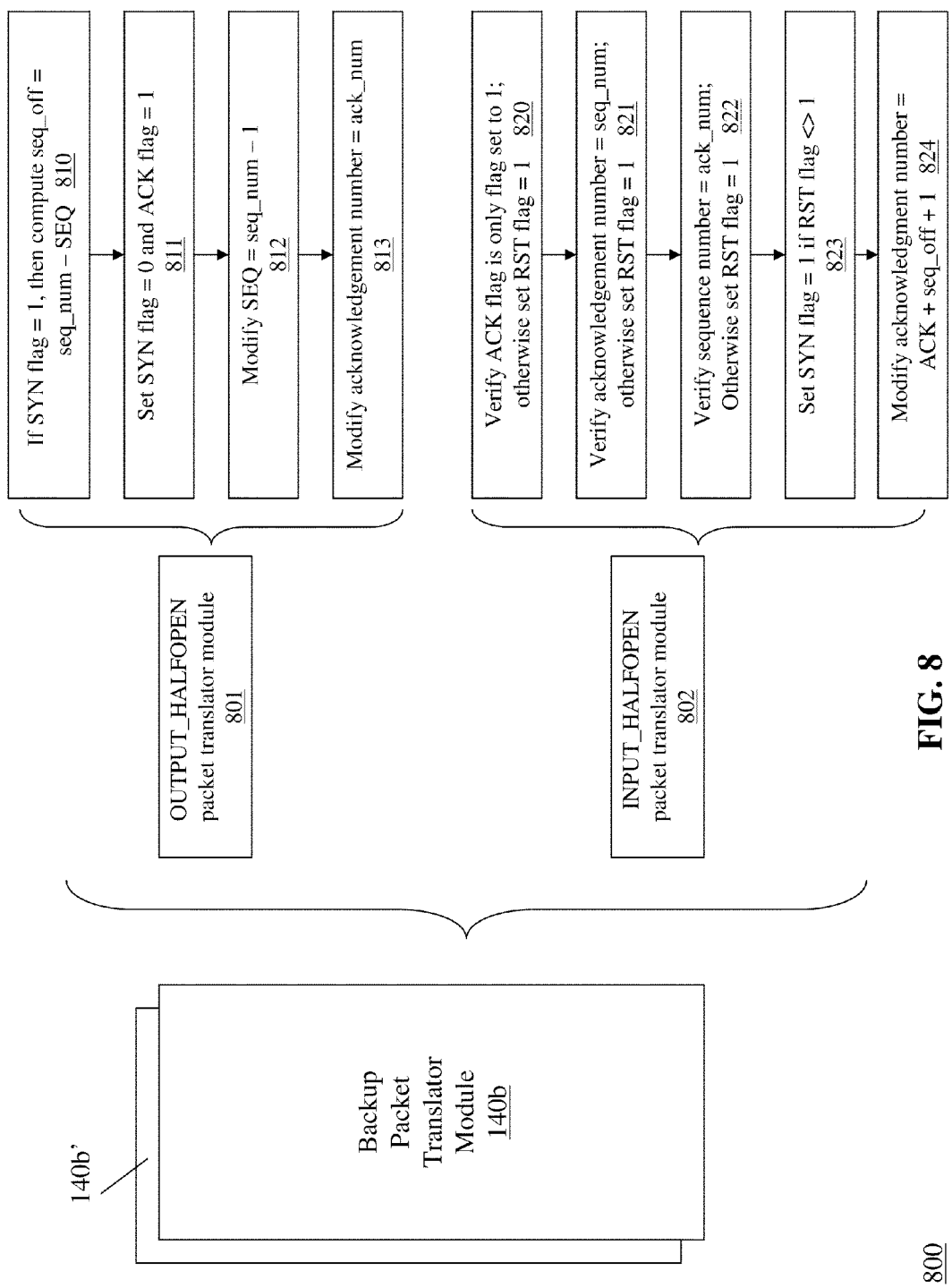
FIG. 8 is a flow diagram of an exemplary method for modifying packets associated with a request to initiate a second transport connection, according to an illustrative embodiment of the invention.

FIG. 8 is a flow diagram of an exemplary method 800 for modifying packets associated with a request to initiate a second transport connection, according to an illustrative embodiment of the invention. Using the OUTPUT_HALFOPEN 801 and INPUT_HALFOPEN 802 packet translator modules (e.g., backup packet translator modules 140b, 140b'), the backup middleware application 120b modifies (step 612 of FIG. 6) the intercepted output packets based on the state information associated with the original network socket 133a stored in the control block (e.g., control block 125b) at the backup networking module 105b. The backup middleware application 120b installs the OUTPUT_HALFOPEN packet translator module 801 in the backup operating system 130b at Interface Location Five 570 of FIG. 5. The backup middleware application 120b installs the INPUT_HALFOPEN packet translator module 802 in the backup operating system 130b at Interface Location Two 530 of FIG. 5.

In one embodiment, the OUTPUT_HALFOPEN packet translator module 801 modifies packets as follows:

- If SYN flag (e.g., SYN flag of the flags 216 of FIG. 2) is set to 1, then compute (810) seq_off=seq_num−SEQ (e.g., sequence number field 206 of FIG. 2).
- Set (811) the SYN flag to 0 and set the ACK flag (e.g., ACK flag of the flags 216 of FIG. 2) in the TCP header (e.g., TCP header 200 of FIG. 2) to 1.
- Modify (812) the SEQ in the TCP header to equal seq_num−1.
- Modify (813) the acknowledgement number (e.g., acknowledgement number field 208 of FIG. 2) in the TCP header with ack_num.

Referring to FIG. 6, the backup networking stack 135b then transmits (614) the modified packets to the remote server 190 of FIG. 1 to elicit an acknowledgment from the remote server 190 to maintain the transport connection between the local server 101 and the remote server 190 via the newly-created second socket 133b. If the transport connection is known to the remote server 190, the backup networking stack 135b at the local server 101 will receive (616) packets associated with a TCP keepalive sequence from the remote server 190. The packets received from the remote server 190 will contain SEQ and ACK fields (e.g., sequence number field 206 and acknowledgment number field 208 of FIG. 2) matching the state information associated with the original network socket 133a stored in the per-socket control block (e.g., control block 125b). The backup operating system 130b receives the packets from the backup networking stack 135b, modifies the received packets, and forwards the packets to the backup middleware application 120b.

In one embodiment, the INPUT_HALFOPEN packet translator module 802 modifies the received packets as follows:

- Verify (820) that the ACK flag (e.g., ACK flag of the flags 216 of FIG. 2) in the TCP header (e.g., TCP header 200 of FIG. 2) is the only flag set to 1. Otherwise, set the RST flag (e.g., RST flag of the flags 216 of FIG. 2) to 1.
- Verify (821) that the acknowledgement number (e.g., acknowledgement number field 208 of FIG. 2) in the TCP header matches the seq_num field in the per-socket control block (e.g., control block 125b'). Otherwise, set the RST flag (e.g., RST flag of the flags 216 of FIG. 2) to 1.
- Verify (822) that the sequence number field (e.g., sequence number field 206 of FIG. 2) in the TCP header matches the ack_num field in control block 125b'. Otherwise, set the RST flag (e.g., RST flag of the flags 216 of FIG. 2) to 1.
- If the RST flag is not set to 1 (either received that way or set by the above steps), then set (823) the SYN flag (e.g., SYN flag of the flags 216 of FIG. 2) to 1.
- Modify (824) the acknowledgement number field in the TCP header with ACK+seq_off (from control block 125b')+1.

If the connection is recoverable (i.e., RST<>1 in step 823 of FIG. 8), the backup middleware application 120*b* changes the state of the transport connection to RECONNECTED and installs OUTPUT_RECONNECTED 901 and INPUT_RECONNECTED 902 packet translator modules (e.g., backup packet translator modules 140*b*, 140*b*') in the backup operating system 130*b*. The backup middleware application installs the OUTPUT_RECONNECTED packet translator module 901 in the backup operating system 130*b* at Interface Location Two 530 of FIG. 5. The backup middleware application 120*b* installs the INPUT_RECONNECTED packet translator module 902 in the backup operating system 130*b* at Interface Location Five 570 of FIG. 5.

Figure 9:
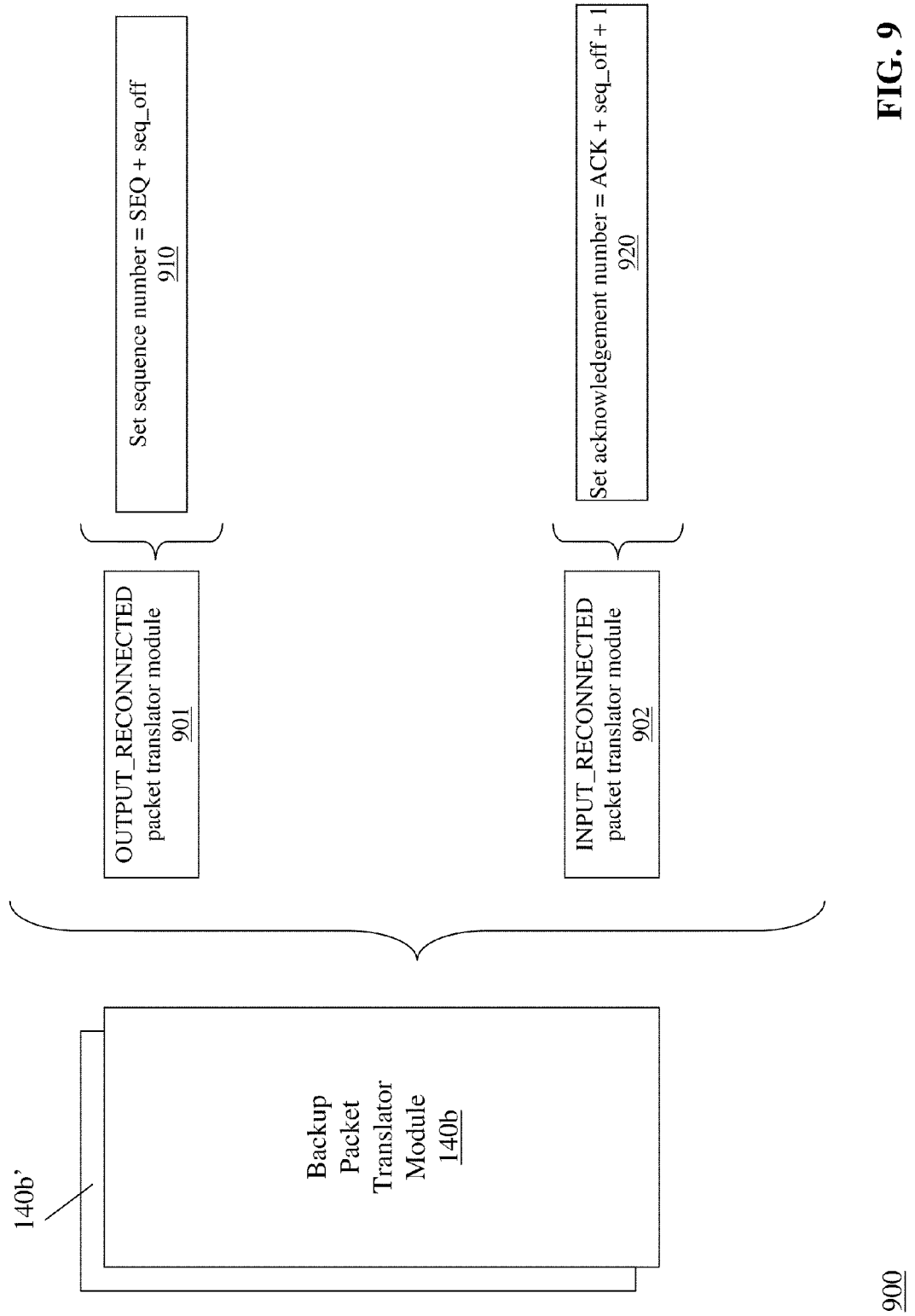
FIG. 9 is a flow diagram of an exemplary method for modifying packets associated with an acknowledgment from a remote server, according to an illustrative embodiment of the invention.

FIG. 9 is a flow diagram of an exemplary method 900 for modifying packets associated with the second transport connection after the connection has been recovered, according to an illustrative embodiment of the invention.

The OUTPUT_RECONNECTED packet translator module 901 modifies packets as follows:

Modify (910) the sequence number (e.g., sequence number field 206 of FIG. 2) in the TCP header (e.g., TCP header 200 of FIG. 2) to equal SEQ+seq_off.

The INPUT_RECONNECTED packet translator module 902 modifies packets as follows:

Modify (920) the acknowledgment number field (e.g., acknowledgement number field 208 of FIG. 2) in the TCP header (e.g., TCP header 200 of FIG. 2) to equal ACK+seq_off+1.

If the transport connection is not recoverable, there will be a mismatch in a sequence number (e.g., sequence number field 206 of FIG. 2). The backup operating system 130*b* detects the mismatch and sets the RST flag (e.g., RST flag of the flags 216 of FIG. 2) of the packets to 1 in the INPUT_HALFOPEN packet translator module 802 of FIG. 8 (e.g., steps 821 or 822 of FIG. 8). The backup middleware application 120*b* receives the packets indicating a failure of the connection attempt. The backup middleware application 120*b* changes the state of the transport connection to BROKEN. Any subsequent utilization of the transport connection by the backup server application 105*b* results in a failure response.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc. and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for transparent recovery of transport connections, the method comprising:
   installing one or more packet translator modules in a first networking module of a first server without modifying an operating system associated with the first networking module;
   installing one or more packet translator modules in a second networking module without modifying an operating system associated with the second networking module;
   collecting, at the first networking module, the state associated with a first connection between the first server and a remote server via a first network socket of the first networking module;
   transmitting, by the first networking module, the state associated with the first connection to a second networking module;
   storing, at the second networking module, the state associated with the first connection;
   opening, by the second networking module, a second network socket based on detection of a failure of the first networking module;
   intercepting, at the second networking module, outbound packets associated with a request to initiate a second connection between the first server and the remote server via the second network socket;
   modifying, by the one or more packet translator modules of the second networking module, the intercepted packets based on the state associated with the first connection stored at the second networking module;
   transmitting, by the second networking module, the modified packets to the remote server to elicit an acknowledgement from the remote server to maintain the first connection between the first server and the remote server via the second network socket;
   receiving, by the second networking module, packets associated with the acknowledgment from the remote server in response to the modified packets transmitted by the second networking module;
   modifying, by the one or more packet translator modules of the second networking module, the received packets to acknowledge the request to initiate the second connection between the first server and the remote server via the second network socket; and
   wherein the one or more packet translator modules of the first networking module are implemented as network filters invoked by the operating system associated with the first networking module when processing a packet, and the one or more packet translator modules of the second networking module are implemented as network filters invoked by the operating system associated with the second networking module when processing a packet.

2. The method of claim 1, wherein a first software application tangibly embodied in the second networking module detects the failure of the first networking module.

3. The method of claim 2, wherein the first software application is a middleware application.

4. The method of claim 2, wherein the first software application is an end-user software application.

5. The method of claim 2, wherein the first software application is an operating system.

6. The method of claim 1, wherein transmitting the state associated with the first connection is based on a period of inactivity on the first connection between the first server and the remote server.

7. The method of claim 1, wherein transmitting the state associated with the first connection occurs at predetermined time intervals, is based on a number of bytes transmitted on the first connection, a number of bytes received on the first connection, or any combination thereof.

8. The method of claim 1, wherein the second networking module is a copy of the first networking module.

9. The method of claim 1, wherein the second networking module is located on the first server or a second server.

10. The method of claim 1, wherein the network protocol is TCP.

11. The method of claim 10, wherein the state associated with the first connection comprises a source IP address, a destination IP address, a source port number, a destination port number, a send sequence number, and a receive sequence number.

12. The method of claim 10, wherein the packets associated with the request to initiate the second connection between the first server and the remote server via the second network socket comprise a TCP connect sequence.

13. The method of claim 10, wherein the packets associated with maintaining the first connection between the first server and the remote server via the second network socket comprise a TCP keepalive sequence.

14. The method of claim 10, wherein modifying the intercepted packets further comprises translating a first send sequence number of the intercepted packets into a second send sequence number based on the state associated with the first connection stored at the second networking module.

15. The method of claim 10, wherein modifying the intercepted packets further comprises translating a first receive sequence number of the intercepted packets into a second receive sequence number based on the state associated with the first connection stored at the second networking module.

16. The method of claim 10, wherein modifying the received packets further comprises translating a first receive sequence number of the received packets into a second receive sequence number associated with the request to initiate the second connection between the first server and the remote server.

17. The method of claim 10, wherein modifying the intercepted packets further comprises translating a packet of the intercepted packets comprising a SYN flag and no ACK flag into a packet comprising an ACK flag and no SYN flag.

18. The method of claim 10, wherein modifying the received packets further comprises translating a packet of the received packets comprising an ACK flag and no SYN flag into a packet comprising a SYN flag and an ACK flag.

19. A system for transparent recovery of transport connections, the system comprising:
 a first networking module of a first server having one or more packet translator modules, the first networking module configured to:
 collect the state associated with a first connection between the first server and a remote server via a first network socket of the first networking module,
 transmit the state associated with the first connection to a second networking module; and
 wherein installation of the one or more packet translator modules in the first networking module does not modify an operating system associated with the first networking module; and
 the second networking module having one or more packet translator modules configured to:
 store the state associated with the first connection;
 open a second network socket based on detecting a failure of the first networking module;
 intercept outbound packets associated with a request to initiate a second connection between the first server and the remote server via the second network socket;
 modify, by one or more packet translator modules, the intercepted packets based on the state associated with the first connection stored at the second networking module;
 transmit the modified packets to the remote server to elicit an acknowledgement from the remote server to maintain the first connection between the first server and the remote server via the second network socket;
 receive packets associated with the acknowledgement from the remote server in response to the modified packets transmitted by the second networking module; and
 modify, by the one or more packet translator modules, the received packets to acknowledge the request to initiate the second connection between the first server and the remote server via the second network socket; and wherein installation of the one or more packet translator modules in the second networking module does not modify an operating system associated with the second networking module; and
 wherein the one or more packet translator modules of the first networking module are implemented as network filters invoked by the operating system associated with the first networking module when processing a packet, and the one or more packet translator modules of the second networking module are implemented as network filters invoked by the operating system associated with the second networking module when processing a packet.

20. A system for transparent recovery of transport connections, the system comprising:
 means for installing one or more packet translator modules in a first networking module of a first server without modifying an operating system associated with the first networking module;
 means for installing one or more packet translator modules in a second networking module without modifying an operating system associated with the second networking module;
 means for collecting, at the first networking module, the state associated with a first connection between the first server and a remote server via a first network socket of the first networking module,
 means for transmitting, by the first networking module, the state associated with the first connection to the second networking module;
 means for storing in memory, at the second networking module, the state associated with the first connection;
 means for opening, by the second networking module, a second network socket based on detection of a failure of the first networking module;
 means for intercepting, at the second networking module, outbound packets associated with a request to initiate a second connection between the first server and the remote server via the second network socket;
 means for modifying, by one or more packet translator modules of the second networking module, the intercepted packets based on the state associated with the first connection stored at the second networking module;
 means for transmitting, implemented by hardware in the second networking module, the modified packets to the remote server to elicit an acknowledgement from the remote server to maintain the first connection between the first server and the remote server via the second network socket;
 means for receiving, implemented by hardware in the second networking module, packets associated with the acknowledgment from the remote server in response to the modified packets transmitted by the second networking module;
 means for modifying, by the one or more packet translator modules of the second networking module, the received packets to acknowledge the request to initiate the second connection between the first server and the remote server via the second network socket; and
 wherein the one or more packet translator modules of the first networking module are implemented as network filters invoked by the operating system associated with the first networking module when processing a packet, and the one or more packet translator modules of the second networking module are implemented as network filters invoked by the operating system associated with the second networking module when processing a packet.

21. A computer program product, tangibly embodied in a non-transitory computer readable storage medium, for transparent recovery of transport connections, the computer program product including instructions operable to cause a data programming apparatus to:

install one or more packet translator modules in a first networking module of a first server without modifying an operating system associated with the first networking module;

install one or more packet translator modules in a second networking module without modifying an operating system associated with the second networking module;

collect the state associated with a first connection between the first server and a remote server via a first network socket of the first networking module;

transmit the state associated with the first connection to the second networking module;

store the state associated with the first connection at the second networking module;

open a second network socket at the second networking module based on a failure of the first networking module;

intercept outbound packets associated with a request to initiate a second connection between the first server and the remote server via the second network socket;

modify the intercepted packets based on the state associated with the first connection stored at the second networking module;

transmit the modified packets to the remote server to elicit an acknowledgement from the remote server to maintain the first connection between the first server and the remote server via the second network socket;

receive packets associated with the acknowledgement from the remote server in response to the modified packets transmitted by the second networking module; and modify the received packets to acknowledge the request to initiate the second connection between the first server and the remote server via the second network socket; and wherein the one or more packet translator modules of the first networking module are implemented as network filters invoked by the operating system associated with the first networking module when processing a packet, and the one or more packet translator modules of the second networking module are implemented as network filters invoked by the operating system associated with the second networking module when processing a packet.

* * * * *